(12) United States Patent
Cai et al.

(10) Patent No.: US 9,593,608 B2
(45) Date of Patent: Mar. 14, 2017

(54) METHOD OF MAKING POLYMERIC BARRIER COATING TO MITIGATE BINDER MIGRATION IN A DIESEL PARTICULATE FILTER TO REDUCE FILTER PRESSURE DROP AND TEMPERATURE GRADIENTS

(75) Inventors: Jun Cai, Midland, MI (US); Steven J. Martin, Midland, MI (US)

(73) Assignee: DOW GLOBAL TECHNOLOGIES LLC, Midland, MI (US)

(*) Notice: Subject to any disclaimer, the term of this patent is extended or adjusted under 35 U.S.C. 154(b) by 958 days.

(21) Appl. No.: 13/509,480

(22) PCT Filed: Jan. 3, 2011

(86) PCT No.: PCT/US2011/020045
§ 371 (c)(1),
(2), (4) Date: May 11, 2012

(87) PCT Pub. No.: WO2011/082399
PCT Pub. Date: Jul. 7, 2011

(65) Prior Publication Data
US 2012/0263914 A1    Oct. 18, 2012

Related U.S. Application Data

(60) Provisional application No. 61/291,436, filed on Dec. 31, 2009.

(51) Int. Cl.
*C04B 35/00* (2006.01)
*F01N 3/022* (2006.01)
(Continued)

(52) U.S. Cl.
CPC ........ *F01N 3/0222* (2013.01); *C04B 35/6263* (2013.01); *C04B 35/6365* (2013.01);
(Continued)

(58) Field of Classification Search
CPC .................................................. C23C 18/02
See application file for complete search history.

(56) References Cited

U.S. PATENT DOCUMENTS 4,652,286 A   3/1987   Kusuda et al.
5,098,455 A   3/1992   Doty et al.
(Continued)

FOREIGN PATENT DOCUMENTS

EP   1142619 B1   1/2007
EP   1780385 A1   5/2007
(Continued)

OTHER PUBLICATIONS

Reed, J., Chapters 10-12, Introduction to the Principles of Ceramic Processing, John Wiley and Sons, NY, NY, 1988.
(Continued)

*Primary Examiner* — Robert Vetere
(74) *Attorney, Agent, or Firm* — The Dobrusin Law Firm, P.C.

(57) ABSTRACT

Ceramic honeycomb structures and methods to make the same are disclosed. The structures may be comprised of at least two separate smaller ceramic honeycombs that have been coated with a polymer to create a polymeric barrier coating and adhered together with a cement comprised of inorganic fibers and a binding phase which is comprised of amorphous silicate, aluminite or alumino silicate glass and other inorganic particles. The polymer is selected such that it is penetratable into or covering the pores in the honeycomb structure to form a thin barrier layer thereon to mitigate migration of the inorganic fibers, binding phase and water into the pores. The polymer is adapted to be burned off or decomposed at or below cement and honeycomb skin firing temperatures, or at or below honeycomb operating temperatures during application to create a honeycomb structure that, when formed into an exhaust filter, does not (Continued)

have any undesired pressure drop increase due to cement migration.

19 Claims, 5 Drawing Sheets

(51) Int. Cl.
  *C04B 35/626*   (2006.01)
  *C04B 35/634*   (2006.01)
  *C04B 35/636*   (2006.01)
  *C04B 37/00*   (2006.01)
  *C04B 38/00*   (2006.01)
  *C04B 111/00*   (2006.01)

(52) U.S. Cl.
  CPC ...... *C04B 35/63488* (2013.01); *C04B 37/005* (2013.01); *C04B 38/0019* (2013.01); *C04B 2111/00793* (2013.01); *C04B 2235/5228* (2013.01); *C04B 2235/96* (2013.01); *C04B 2237/062* (2013.01); *C04B 2237/064* (2013.01); *C04B 2237/10* (2013.01); *C04B 2237/341* (2013.01); *Y02T 10/20* (2013.01); *Y10T 428/24149* (2015.01)

(56) References Cited

U.S. PATENT DOCUMENTS

| | | | |
|---|---|---|---|
| 5,173,349 A | 12/1992 | Yavuz et al. | |
| 5,194,154 A | 3/1993 | Moyer et al. | |
| 5,198,007 A | 3/1993 | Moyer et al. | |
| 5,322,537 A | 6/1994 | Nakamura et al. | |
| 5,340,516 A | 8/1994 | Yavuz et al. | |
| 6,306,335 B1 | 10/2001 | Wallin et al. | |
| 6,596,665 B2 | 7/2003 | Wallin et al. | |
| 6,669,751 B1 | 12/2003 | Ohno et al. | |
| 6,797,666 B2 | 9/2004 | Harada et al. | |
| 7,275,980 B2 | 10/2007 | Bonner et al. | |
| 2001/0038810 A1 | 11/2001 | Wallin et al. | |
| 2003/0140495 A1* | 7/2003 | Hardesty | F01N 3/2857 |
| | | | 29/890 |
| 2004/0020359 A1 | 2/2004 | Koermer et al. | |
| 2004/0219126 A1 | 11/2004 | Seto et al. | |
| 2005/0037147 A1* | 2/2005 | Ogunwumi et al. | 427/393.6 |
| 2005/0113249 A1 | 5/2005 | Ziebarth et al. | |
| 2005/0191480 A1* | 9/2005 | Tao et al. | 428/304.4 |
| 2006/0099397 A1 | 5/2006 | Thierauf et al. | |
| 2008/0160250 A1* | 7/2008 | Adler et al. | 428/116 |
| 2008/0178992 A1* | 7/2008 | Pillai | B28B 1/002 |
| | | | 156/197 |
| 2011/0094419 A1* | 4/2011 | Fernando | B01J 35/06 |
| | | | 106/618 |

FOREIGN PATENT DOCUMENTS

| | | |
|---|---|---|
| EP | 2050492 A2 | 4/2009 |
| EP | 2050728 B1 * | 12/2011 |
| JP | 2009190964 A | 8/2009 |
| WO | 9933125 | 7/1999 |
| WO | 0145828 A1 | 6/2001 |
| WO | 03051488 A1 | 6/2003 |
| WO | 03082773 A1 | 10/2003 |
| WO | 2004011124 A1 | 2/2004 |
| WO | 2004011386 A1 | 2/2004 |
| WO | 2007050246 A2 | 5/2007 |

OTHER PUBLICATIONS

Masafumi, Kunieda, et al., Ibiden Co. Ltd., Machine Translation of JP2009-190964, Aug. 27, 2009, "Method of Manufacturing Honeycomb Structure".

\* cited by examiner

METHOD OF MAKING POLYMERIC BARRIER COATING TO MITIGATE BINDER MIGRATION IN A DIESEL PARTICULATE FILTER TO REDUCE FILTER PRESSURE DROP AND TEMPERATURE GRADIENTS

This application claims the benefit of U.S. Provisional Application No. 61/291,436, filed on Dec. 31, 2009, which is hereby incorporated by reference in its entirety.

TECHNICAL FIELD

In the fabrication of diesel particulate filters, cement and skin are used to assemble and skin honeycomb filters. In order for cement and skin to achieve their adhesion function, binders are essential in their formulation to create adhesion to the honeycomb substrate. The binders usually include inorganic and organic binders. During the cement and skin application process, the binders migrate into porous honeycomb substrate due to capillary force and generate binding strength after drying. After cement and skin firing, although organic binders are burned off, inorganic binders remain in the honeycomb substrate and sinter to form inorganic binding at the interface.

As binders can diffuse into one or more channels of the honeycomb substrate, the sintered inorganic binders can block or partially block the porous channel walls, resulting in higher pressure drop in the channels adjacent to the interface of substrate with cement and skin. On one hand, the pressure drop increase in these blocked channels results in higher pressure drop in the whole filter, which is not desired for the diesel soot filtration function and engine performance. On the other hand, during a filter regeneration process, the air flow through these blocked channels is reduced. As a result, higher temperature gradients in the part lower the thermal shock robustness of the honeycomb filter. Because of increased filter pressure drop and temperature gradients, the sintering of inorganic binder on the honeycomb substrate increases the modulus of the honeycomb substrate in the area contacted with inorganic binder. The increased modulus in the honeycomb substrate produces an increased stress for a given applied temperature gradient.

Various approaches have been attempted to reduce these problems. For example, one way was to decrease the amount of water in the binder formulation, thereby increasing viscosity and immobilizing the inorganic binder. Another approach is to replace the relatively small size inorganic binder with a larger size binder in the cement and skin formulation to reduce inorganic binder migration. However, all these methods require modification of the existing formulation, or development of a new formulation, hence affecting the performance and processing characteristics of the cement and skin.

There is a need for a way to prevent or reduce any increase of pressure drop and temperature gradients due to inorganic binder migration in a honeycomb porous ceramic substrate by preventing or minimizing the diffusion of inorganic binder through the porous substrate without affecting performance and processing characteristics of cement and skin in honeycomb ceramic products such as diesel particulate filters.

BRIEF SUMMARY

In one embodiment, ceramic honeycomb structures and various methods to make them are disclosed. The ceramic structures may include at least two separate smaller ceramic honeycombs that have been coated with a polymer to create a polymeric barrier coating and adhered together with a cement comprised of inorganic fibers and a binding phase which is comprised of amorphous silicate, aluminite or alumino silicate glass and other inorganic particles. The polymers are penetratable into pores in the honeycomb structure to form a thin barrier layer thereon to mitigate migration of any inorganic fibers and binding phase or water into the pores. The polymers are further adapted to burn off at or below cement and honeycomb skin firing temperatures such that the honeycomb structures, when formed into exhaust filters, do not experience any pressure drop.

In one embodiment, the method to make the honeycomb structures includes coating the ceramic honeycomb structure with a polymer to create a polymeric barrier coating; curing the polymeric barrier coating; applying a cement (hot set or cold set) comprised of inorganic fibers and a binding phase which is comprised of amorphous silicate, aluminite or alumino silicate glass and other inorganic particles. The polymers are penetratable into pores in the honeycomb structure to form a thin barrier layer thereon to mitigate migration of inorganic fibers and binding phase into the pores; and burning off the polymer barrier coating at or below cement and honeycomb skin firing temperatures. In other embodiments, if a cold set cement is used, the polymer barrier coating may be burned off at or below the honeycomb substrate operating temperature.

DETAILED DESCRIPTION

Figure 3:
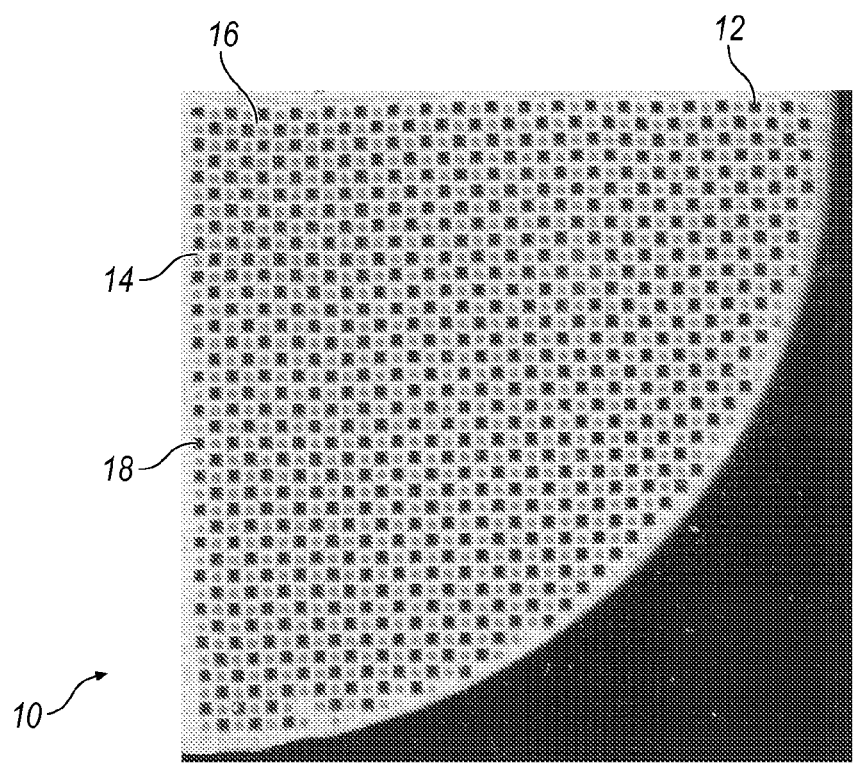
FIG. 3 is a photomicrograph of a thermocouple location in a burner of segmented filters.

The ceramic honeycomb 10, one example of which is depicted in FIG. 3, is characterized in having multiple cells that extend axially throughout the length of the honeycomb body. The cells 12 are defined by multiple intersecting walls 14. The walls and the intersection points 16 define the number of cells 18, as well as their cross-sectional size and dimensions. A typical honeycomb for many filtration or catalysis applications will contain from 25 to 1000 cells/square inch (about 4 to 150 cells/square centimeter) of cross-sectional area (i.e., transverse to the longitudinal extension). Wall thicknesses are typically from 0.05 to 10 mm, preferably from 0.2 to 1 mm, although larger or smaller wall thicknesses might be used.

The ceramic honeycomb may be monolithic (i.e., formed in a single piece), or may be an assembly of smaller honeycomb structures which are manufactured separately and then assembled together, usually using a ceramic cement to adhere the individual pieces together.

The honeycomb is made of one or more ceramic materials, the selection of which is governed by the end-use applications in which the structure is to be used. Exemplary ceramics include alumina, zirconia, silicon carbide, silicon nitride and aluminum nitride, silicon oxynitride and silicon carbonitride, mullite, cordierite, beta spodumene, aluminum titanate, strontium aluminum silicates, lithium aluminum silicates. Preferred pourous ceramic bodies include silicon carbide, cordierite, acicular mullite or combination thereof. Silicon carbide honeycombs may be as described in U.S. Pat. No. 6,669,751 B1, EP1142619 A1 and WO 2002/070106 A1. Examples of acicular mullite honeycomb structures include those described in U.S. Pat. Nos. 5,194,154; 5,173,349; 5,198,007; 5,098,455; 5,340,516; 6,596,665 and 6,306,335; U.S. Patent Application Publication 2001/0038810; and International PCT publication WO 03/082773, incorporated herein by reference. Other suitable porous bodies are described by U.S. Pat. No. 4,652,286; U.S. Pat. No. 5,322,537; WO 2004/011386 A1; WO 2004/011124 A1; US 2004/0020359 A1 and WO 2003/051488 A1, incorporated herein by reference.

When the ceramic honeycomb structure is to be used in applications such as filtration and catalysis, the walls of the honeycomb are preferably porous, so that a fluid can pass through the pores from one axially-extending cell to one or more adjacent cells.

The walls of the honeycomb in such cases generally will have a porosity of about 30% to 85%. Preferably, the walls have a porosity of at least about 40%, more preferably at least about 45%, even more preferably at least about 50%, and most preferably at least about 55% to preferably at most about 80%, more preferably at most about 75%, and most preferably at most about 70%. If the honeycomb is an assembly of smaller honeycombs that are cemented together, the cement layer(s) may have similar porosities. Porosities are determined by water immersion methods.

An inorganic skin is formed by applying a skin-forming composition to at least a portion of the periphery of the honeycomb, and then firing the composition under conditions that a silicate, aluminate or alumino-silicate binding phase forms. This glass binding phase binds inorganic fibers in the skin together and bonds the peripheral ceramic skin to the ceramic honeycomb. The skin-forming composition should be applied to all peripheral cells having exposed interiors.

Figure 2:
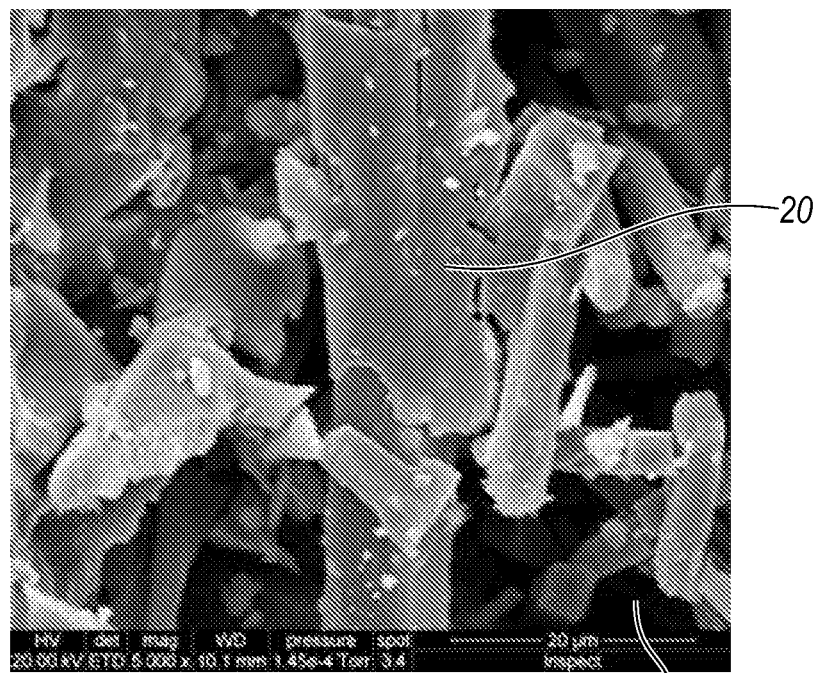
FIG. 2 is a photomicrograph of a binder coating on an acicular mullite substrate according to one aspect of the disclosure.

As seen in FIG. 2, the inorganic skin contains at least two components, the first being an inorganic filler that includes at least 40 weight percent inorganic fibers 20 and the second being the silicate, aluminate or alumino-silicate binding phase 22. The inorganic skin contains no more than 5% by weight of low aspect ratio inorganic particles that have a different coefficient of linear expansion than the inorganic fibers after the drying step is completed.

The inorganic fibers are composed of one or more inorganic materials that may be amorphous, crystalline or partially amorphous and partially crystalline. The fibers may be an amorphous or semi-crystalline material that at least partially crystallizes during the drying process or some subsequent thermal treatment. The particular selection of inorganic fibers in any case is generally made in consideration of the thermal conditions to which the fibers will be exposed during manufacture or use. The inorganic fibers should not melt or soften significantly during manufacture and use conditions, so that they maintain their fibrous geometry. Similarly, the inorganic fibers should not react or decompose during conditions of manufacture and use. It is usually not necessary that the inorganic fibers have a coefficient of thermal expansion similar to that of the underlying ceramic honeycomb, although this may be the case.

The inorganic fibers have an aspect ratio (longest dimension·divided by shortest dimension) of at least 10, preferably at least 20. Any longer aspect ratio can be suitable, although aspect ratios of up to about 100 are more common. Generally, the diameter of the fibers is from about 0.1 micrometer to about 100 micrometers. The fiber diameter may be at least about 0.2, 0.4, 0.6, 0.8, 1, 2 or 4 micrometers to at most about 50, 25, 20, 15, 12, 10 or 8 micrometers.

The number average length of the inorganic fibers may range from 100 microns to 130 millimeters or more. The number average length is preferably at least 150 microns. The number average length is preferably no greater than 10 millimeters. The number average length may be no greater than 5 millimeters or no greater than 2 millimeters. Longer fibers, such as those having lengths of 10 mm or more, often tend to form bundles during processing. These bundles cause difficulties in applying the skin and also lead to inconsistencies in the skin composition. Therefore, longer fibers preferably are used somewhat sparingly if at all.

In some embodiments of the invention, essentially all of the fibers have a length of less than 1 mm.

In other embodiments, the fibers have a bimodal or multimodal length distribution, in which one portion of the fibers are shorter fibers having a number average length of from 100 to 1000 microns, and at least one other portion of the fibers are longer fibers having a number average length of at least 1 millimeter, preferably from 1 to 100 millimeters, more preferably from 2 to 100 millimeters and even more preferably from 5 to 30 millimeters. In such embodiments, the longer fibers preferably constitute from 1 to 50, more preferably from 3 to 30 and even more preferably from 5 to 25 percent of the total weight of the inorganic fibers. Mixed length fibers provide certain advantages. The presence of a minor proportion of longer fibers tends to increase the viscosity of the skin-forming composition, at a given fiber content in the composition. The viscosity of the skin-forming composition should be somewhat high, so it can be applied and shaped readily without sagging or flowing off of the honeycomb before it can dry. The presence of a minor proportion of longer fibers can allow a good working viscosity to be achieved without unduly increasing the fiber content. If the fiber content becomes too high, there may not be enough colloidal silica and/or colloidal alumina in the composition to adequately bind the fibers to each other or to the underlying honeycomb. Typically, the strength of the skin tends to decrease with increasing fiber length, because the number of fibers decreases as their length increases, and fewer fibers means fewer points of intersection where they can be bound together. When a mixture of shorter and longer fibers is used, the strength of the skin is often comparable to that of a skin that contains an equivalent proportion of only short fibers. Thus, a mixture of shorter fibers and a minor proportion of longer fibers can provide significant processing benefits with little or no corresponding disadvantages.

Fiber lengths and aspect ratios are determined for purposes of this invention by microscopic examination. A representative sample (100 to 200 is generally sufficient) of the fibers, examined under suitable magnification (such as under a scanning electron microscope), may reveal the lengths and diameters of the individual fibers, which can be measured. Number average length and aspect ratio are then calculated in a manner well known to those of ordinary skill in the art from the individual fiber measurements.

Suitable inorganic fibers include, for example, silicate or alumino silicate fibers, which may be amorphous, partially crystalline or fully crystalline. The inorganic fibers may contain a crystalline phase that is surrounded by glass. The fiber may also contain other compounds such as rare earths, zirconium, iron, boron and alkaline earths. Examples of useful inorganic fibers include mullite fibers, such as are available from Unifrax; alumina-zirconium-silicate fibers, such as are available from Unifrax; alumina fibers containing up to 10% by weight silica, such as are available from Saffil; mullite fibers such as are available from Unifrax or 3M; a-alumina and a-alumina+mullite fibers such as Nextel312 or Nextel610 fibers from 3M; y-alumina+mullite+amorphous $S_iO_2$ fibers such as Nextel440 fibers from 3M; y-alumina+amorphous $S_iO_2$ fibers such as Nextel 550 fibers from 3M; quartz fibers such as are available from Saint Gobain; e-glass or s-glass fibers; borosilicate fibers such as are available from Mo—SiC Corporation; basalt fibers such as are available from Alb arrie, wollastonite fibers such as are available from Fibertec, and the like.

The skin-forming composition may contain low aspect ratio inorganic filler particles in addition to the inorganic fibers described above. These inorganic filler particles are different from and do not include the colloidal silica and/or colloidal alumina component of the skin-forming composition. The inorganic filler particles do not form a binding phase when the skin-forming composition is dried. The inorganic filler particles instead retain their particulate nature throughout the drying process, although they may become bound by the glassy binding phase to other particles or to the inorganic fibers. As mentioned before, "low aspect ratio" refers to an aspect ratio of less than 10, preferably less than 5.

These inorganic filler particles can, for purposes of this invention, be classified into two types. The first type is particles that have the same CTE or very nearly the same CTE as the inorganic fiber (i.e., differing by no more than 1 ppm/° C. in the temperature range of from 100 to 600° C.), after the drying step is completed. The comparison is performed on the basis of the dried skin composition to account for changes in CTE that may occur to the fibers and/or other particles during the drying step, due to, for example, changes in crystallinity and/or composition that may occur. Particles of this type generally have the same or nearly the same chemical composition as the inorganic fiber. A common source of this type of particle is so-called "shot" material, which is a by-product of the fiber manufacturing process and is included in many commercial grades of inorganic fibers. However, this type of particle may be supplied from other sources as well.

The second type of inorganic filler particles have a CTE which is significantly different (i.e., different by more than 1 ppm/° C., more preferably by at least 2 ppm/° C. in the temperature range from 100 to 600° C.) than that of the inorganic fibers, after the drying step is completed. One advantage of this invention is that it is not necessary to add fillers or otherwise attempt to "match" the coefficient of thermal expansion of the skin to that of the underlying honeycomb. Examples of this second type of inorganic filler particles are alumina, silicon carbide, silicon nitride, mullite, cordierite and aluminum titanate.

The skin-forming composition also contains colloidal silica, colloidal alumina or a mixture of colloidal silica and colloidal alumina. Such colloidal materials take the form of a particulate having a number average particle size of less than 1 micrometer, preferably less than 250 nanometers. The particles may be dispersed in water or other carrier liquid. The particles may be crystalline or amorphous. Preferably, the colloidal particles are amorphous. The colloid is preferably a silicate, aluminate, alumino silicate sol. Colloidal silica products generally have a basic pH and a negative surface charge as determined electrophoretically. Colloidal alumina desirably has an acidic pH, where the alumina particles have a positive charge as determined electrophoretically. Illustrative colloids those available under tradenames such as KASIL and N, from PQ Corporation, Valley Forge, Pa.; ZACSIL, from Zaclon Incorporated, Cleveland, Ohio; Sodium Silicates, from Occidental Chemical Corporation, Dallas, Tex.; NYACOL, Nexsil colloidal silica and Al20 colloidal alumina, from Nyacol Nanotechnologies Inc., Ashland Mass. and Aremco 644A and 644S, from Aremco Products Inc., Valley Cottage, N.Y.

The skin-forming composition also includes a carrier liquid. The mixture of carrier fluid and colloidal silica and/or colloidal alumina particles forms a paste or viscous fluid in which the inorganic filler is dispersed. The fluid or semi-fluid nature of the skin-forming composition permits it to be applied easily and to adhere well to the underlying honeycomb until the drying step is completed. The carrier liquid may be, for example, water or an organic liquid. Suitable organic liquids include alcohols, glycols, ketones, ethers, aldehydes, esters, carboxylic acids, carboxylic acid chlorides, amides, amines, nitriles, nitro compounds, sulfides, sulfoxides, sulfones and the like. Hydrocarbons, including aliphatic, unsaturated aliphatic (including alkenes and alkynes) and/or aromatic hydrocarbons, are useful carriers. Organometallic compounds are also useful carriers. Preferably, the carrier fluid is an alcohol, water or combination thereof. When an alcohol is used, it is preferably methanol, propanol, ethanol or combinations thereof. Water is the most preferred carrier fluid.

The cement may contain other useful components in addition to the inorganic filler, colloidal silica and/or colloidal alumina and carrier fluid. An organic binder or plasticizer can provide desirable rheological properties to the skin-forming composition, and therefore preferably is present. Preferably, the binder dissolves in the carrier liquid. Examples of suitable binders and organic plasticizers include cellulose ethers, such as methyl cellulose, ethyl cellulose, hydroxypropylmethyl cellulose, hydroxypropyl cellulose, carboxylmethyl cellulose and the like; polyethylene glycol, fatty acids, fatty acid esters and the like.

Other optional components include dispersants, deflocculants, flocculants, defoamers, lubricants and preservatives, such as those described in Chapters 10-12 of Introduction to the Principles of Ceramic Processing, J. Reed, John Wiley and Sons, NY, 1988. The skin-forming composition also may contain one or more porogens. Porogens are materials specifically added to create voids in the skin after being heated to form the amorphous phase. Typically these are any particulates that decompose, evaporate, or in some way volatilize during a heating or firing step to leave a void. Examples include flour, wood flour, carbon particulates (amorphous or graphitic), nut shell flour or combinations thereof.

The fiber should constitute at least 10% by weight of the solids of the skin-forming composition, and may constitute up to 90% by weight thereof. For purposes of this calculation, the "solids" are constituted by the inorganic materials in the skin-forming composition, including fillers and inorganic binding phase, that remain in the skin after the cement composition is fired. In most cases, the solids will be made up of the inorganic fiber, the colloidal silica and/or colloidal alumina, plus any inorganic filler particles that may be present. Carrier fluids and organic materials generally are lost from the composition during the drying step(s) and are no longer present in the dried skin. The "solids" therefore do not include any amounts of those materials.

Typically the fibers constitute at least 30%, preferably at least 50 percent and more preferably at least 60% by weight of the solids in the skin-forming composition. The fibers preferably constitute no more than 85%, still more preferably no more than 80%, of the weight of the solids.

The colloidal silica and/or alumina should constitute from 10 to 70%, preferably from 15 to 50% and more preferably from 20 to 40% of the weight of the solids in the cement composition. Organic materials such as binders, porogens, plasticizers and the like typically constitute, in the aggregate, from 0 to 15%, preferably from 1 to 10% of the total weight of the skin-forming composition.

Low aspect ratio fillers, if present at all, may constitute up to two-thirds of the combined weight of the fibers and low aspect ratio fillers. Preferably, low aspect ratio fillers constitute no more than 25%, still more preferably no more than 15% of the combined weight of the fibers and low aspect ratio fillers. Low aspect ratio fillers of the first type mentioned above (having a CTE close to that of the fibers) may constitute up to two-thirds, preferably up to 25% and more preferably up to 10% of the combined weight of the fibers and low aspect ratio fillers. Low aspect ratio fillers of the second type described above (having a CTE at least 1 ppm/° C. different from that of the fibers) preferably constitute no more than 5% of the solids of the cement composition.

The fibers and low aspect ratio fillers may together constitute from 30 to 90%, preferably from 50 to 85% and still more preferably from 60 to 80% of the weight of the solids in the skin-forming composition.

In one embodiment, the skin-forming composition contains, as fillers, only the inorganic fiber, "shot" material from the inorganic fiber, and optionally the second type of inorganic filler particle, which may be present in an amount from 0 to 5% by weight of the solids of the cement, but essentially no (less than 5 weight percent, preferably no more than 1%) other organic filler particles of the first type.

In another embodiment, the skin-forming composition contains the inorganic fiber and from 0-5 weight percent, based on weight of the solids, of the second type of inorganic filler, but no "shot" material or other inorganic filler of the first type. Accordingly, the skin-forming composition may contain no inorganic filler particles of the second type at all, or may contain only very small proportions thereof, such as, for example, from 0 to 3% or from 0 to 2% or from 0 to 1% of the solids of the skin-forming composition.

The skin-forming composition contains enough of the carrier fluid to wet the colloidal silica and/or alumina and produce a paste or viscous fluid, in which the inorganic fibers are dispersed. A useful Brookfield viscosity at 25° C., using a #6 spindle and a rate of 5 rpm, is typically at least about 5, 10, 25, 50, 75 or even 100 Pa·s· up to about 1000 Pa·s, preferably up to about 500 Pa·s. The skin-forming composition may exhibit shear-thinning behavior, such that its viscosity becomes lower at higher shear. The total amount of carrier fluid in the skin-forming composition (including any carrier fluid that may be brought in with the colloidal silica and/or colloidal alumina) is generally from about 25% by weight to at most about 90% by weight of the entire composition. A preferred amount of carrier fluid is from 40 to 70% by weight of the entire composition.

A skin is formed by applying the skin-forming composition to at least a portion of the periphery of the ceramic honeycomb and drying the skin-forming composition. Any pre-existing skin as may be present on the honeycomb preferably is removed before applying the skin-forming composition.

The manner of applying the skin-forming composition not critical, and any suitable method by which the composition can be applied at the desired thickness is suitable. The skin-forming composition can be applied manually or through the use of various types of mechanical apparatus. The skin-forming composition may be applied under subatmospheric pressures to facilitate removal of the carrier fluid during the application process.

The periphery of the ceramic honeycomb usually is not smooth, and in most cases a certain proportion of the axially-extending cells around the periphery of the honeycomb will be open before the skin is applied. The skin-forming composition typically will be applied in such a manner as to fill those open cells and to form a somewhat smooth exterior surface. Therefore, the thickness of the skin usually will vary. At its thinnest points, the applied skin should be at least 1 mm in thickness, and may be as much as 25 mm.

It has been understood that binder migration has been an issue that may give rise to pressure drop and temperature gradients within the honeycomb structure. The disclosure includes methods to prevent or reduce the increase of pressure drop and temperature gradient due to inorganic binder migration by mitigating the diffusion of binders through the porous honeycomb ceramic substrate. This may be accomplished by applying a polymer to the substrate prior to firing that will penetrate into the substrate and either form a barrier between the binder and the pores in the honeycomb substrate, or create a coating in the pores that reduces the diameter of the pores to mitigate migration of the binder into the pores.

The polymer can be either organic or inorganic.

Suitable organic polymers may be selected from the group consisting of hydrophobic and hydrophilic polymers, or mixture thereof. Organic polymers usually vaporize during firing, and leave a very small volume of sintered ash.

Hydrophobic polymers may be used when it is determined that a barrier should be created between the binder and the pores to prevent binder migration. Any hydrophobic polymer may be used provided it can be vaporized during firing. Without limitation, suitable hydrophobic polymers may be selected from the group consisting of acrylics, amides, imides, carbonates, dienes, esters, ethers, fluorocarbons, oletins, styrenes, vinyl acetates, vinyl and vinylidiene chlorides, vinyl esters, vinyl ketones, vinyl pyridine, vinyl pyrrolidone polymers, and mixture thereof Hydrophilic polymers may be used to coat the pores in the ceramic structure to reduce there relative size to mitigate or prevent binder migration into the pore. Any hydrophilic polymer may be used provided it can be vaporized during firing. Without limitation, suitable hydrophilic polymers may be selected from the group consisting of acrylics, amine functional polymers, ethers, styrenes, polystyrene sulfonate polymers, vinyl acids, vinyl alcohols, and mixtures thereof.

Inorganic polymers may also be utilized to mitigate binder migration and reduce pressure drop and temperature gradients. Inorganic polymers can fill the pores, form a film over the pores, or change the water contact angle of the substrate to prevent or reduce water and binder migration. Without limitation, suitable inorganic polymers may be silicone, or relative polymers that can be applied to the substrate prior to firing, and once fired, sinter to a reduced ash volume.

Whichever polymer is selected it may be applied to the substrate prior to firing by brushing, spraying, rolling, dipping, powder coating and melting, to name a few. After application, the polymer coating is cured. Curing may be enhanced by increasing the air flow over the ceramic honeycomb, by increasing the temperature of the substrate to enhance curing of the polymer, or any combination thereof.

After the polymer is applied and cured, the entire honeycomb ceramic structure is fired as mentioned before to for the ceramic structure and skin, and vaporize the polymer barrier.

The applied skin-forming composition is then fired to form an inorganic skin on at least a portion of the periphery of the ceramic honeycomb. By "firing", it is meant that the composition is subjected to an elevated temperature sufficient to remove the carrier fluid, any organics that may be present, and to convert the colloidal silica and/or colloidal alumina into a binding phase which binds the inorganic fibers together and bonds the skin to the underlying honeycomb. In some cases, drying can be at least partially performed at approximately ambient temperatures, such as from 0 to 40° C. Much of the carrier fluid, for example, often is lost even as the skin-forming composition is applied. The firing step preferably includes a temperature of at least 500° C., which is generally sufficient to remove organic materials such as plasticizers, binders and porogens. The firing step may include a temperature of at least 800° C., at least 1000° C., at least 1100° C. or at least 1400° C. The time at which the coated honeycomb is exposed to such temperatures is sufficient to remove the carrier fluid (if any), burn out any organics as may be present and convert the colloidal silica and/or colloidal alumina into a binding phase. This time may be as short as a few minutes up to several hours. To prevent cracking due to thermal shock, it is preferred to bring the part gradually up to the maximum firing and/or calcination temperature, and when the firing process is completed, to gradually cool the part back to ambient temperatures.

It is possible to conduct the firing step in two or more discrete substeps, or to conduct a firing step followed by one or more calcining steps which are performed at higher temperatures. A calcining step is often useful to condition the skinned honeycomb to temperature conditions to which it will be exposed during its subsequent use.

When the ceramic honeycomb is an acicular mullite, the firing step can be combined with a thermal treatment step in which residual fluorine is removed from the honeycomb. The ability to combine these two operations into a single step can lead to the elimination of a process step and a corresponding reduction in production costs.

The product that remains after the firing step is a central ceramic honeycomb having a skin applied and bound to at least a portion of the periphery. The skin typically contains from 30 to 90%, preferably from 50 to 80% and more preferably from 60 to 80% by weight of inorganic fibers as described before. The fibers preferably have a number average length of greater than 100 microns, and may have a bimodal or multimodal size distribution as described before. The fibers preferably are randomly oriented within the skin.

The skin also typically contains from 10 to 70%, preferably from 15 to 50% and more preferably from 20 to 40% of a silicate, aluminate or alumino-silicate binding phase. The binding phase binds the fibers to each other (and to inorganic filler particles, if present) and also binds the skin to the underlying ceramic honeycomb. The skin may contain low aspect ratio inorganic filler particles, but should not contain more than 5% by weight of low aspect inorganic filler particles that have a CTE significantly different from the CTE of the inorganic fibers.

The skin is usually porous. The porosity of the skin may be from 10 to 90%, and is more typically from 40 to 70%.

The skin material typically has a modulus that is significantly lower than that of the underlying ceramic honeycomb. Its modulus may be, for example in the range of 3 to 25% of that of the honeycomb material. It is believed that this lower modulus may be at least in part responsible for the higher crack resistance of the skin. The modulus of the skin material can be measured by forming 8 mm×4 mm×40 mm test bars from the skin forming composition, drying them and measuring modulus according to ASTM 1259-98.

The skinned honeycomb can be used as a particulate filter, especially for removing particulate matter from power plant (mobile or stationary) exhaust gases. A specific application of this type is a soot filter for an internal combustion engine, especially a diesel engine.

Functional materials can be applied to the skinned honeycomb, before or after applying the skin, using various methods. The functional materials may be organic or inorganic. Inorganic functional materials, particularly metals and metal oxides, are of interest as many of these have desirable catalytic properties, function as sorbents or perform some other needed function. One method of introducing a metal or metal oxide onto the composite body is by impregnating the honeycomb with a solution of a salt or acid of the metal, and then heating or otherwise removing the solvent and, if necessary calcining or otherwise decomposing the salt or acid to form the desired metal or metal oxide.

Thus, for example, an alumina coating or a coating of another metal oxide is often applied in order to provide a higher surface area upon which a catalytic or sorbent material can be deposited. Alumina can be deposited by impregnating the honeycomb with colloidal alumina, followed by drying, typically by passing a gas through the impregnated body. This procedure can be repeated as necessary to deposit a desired amount of alumina. Other ceramic coatings such as titania can be applied in an analogous manner.

Metals such as barium, platinum, palladium, silver, gold and the like can be deposited on the composite body by impregnating the honeycomb (the internal walls of which are preferably coated with alumina or other metal oxide) with a soluble salt of the metal, such as, for example, platinum nitrate, gold chloride, rhodium nitrate, tetraamine palladium nitrate, barium formate, followed by drying and preferably calcination. Catalytic converters for power plant exhaust streams, especially for vehicles, can be prepared from the skinned honeycomb in that manner.

Suitable methods for depositing various inorganic materials onto a honeycomb structure are described, for example, in U.S. 205/0113249 and WO2001045828, incorporated herein by reference. These processes are generally in relation to the skinned honeycomb of this invention.

In an especially preferred embodiment, alumina and platinum, alumina and barium or alumina, barium and platinum can be deposited onto the honeycomb in one or more steps to form a filter that is simultaneously capable of removing particulates such as soot, NOx compounds, carbon monoxide and hydrocarbons from a power plant exhaust, such as from vehicle engines.

The following examples are provided to illustrate the invention, but are not intended to limit the scope thereof. All parts and percentages are by weight unless otherwise indicated.

Comparative Example A 42.0 wt % of ball milled aluminum zirconium silicate fiber (FIBERFRAX Long Staple Fine fiber, available from Unifrax LLC, Niagara Falls, N.Y.), 13.5 wt % of colloidal alumina (AL20SD, available from Nyacol Nano Technologies, Inc, Ashland, Mass.), 40.5 wt % of water, 2 wt % methyl cellulose (METHOCEL A15LV, available from The Dow Chemical Co. Midland, Mich.), and 2 wt % polyethylene glycol 400 (available from Alfa Aesar, Ward Hill, Mass.) were mixed to achieve uniform mixture.

Figure 1:
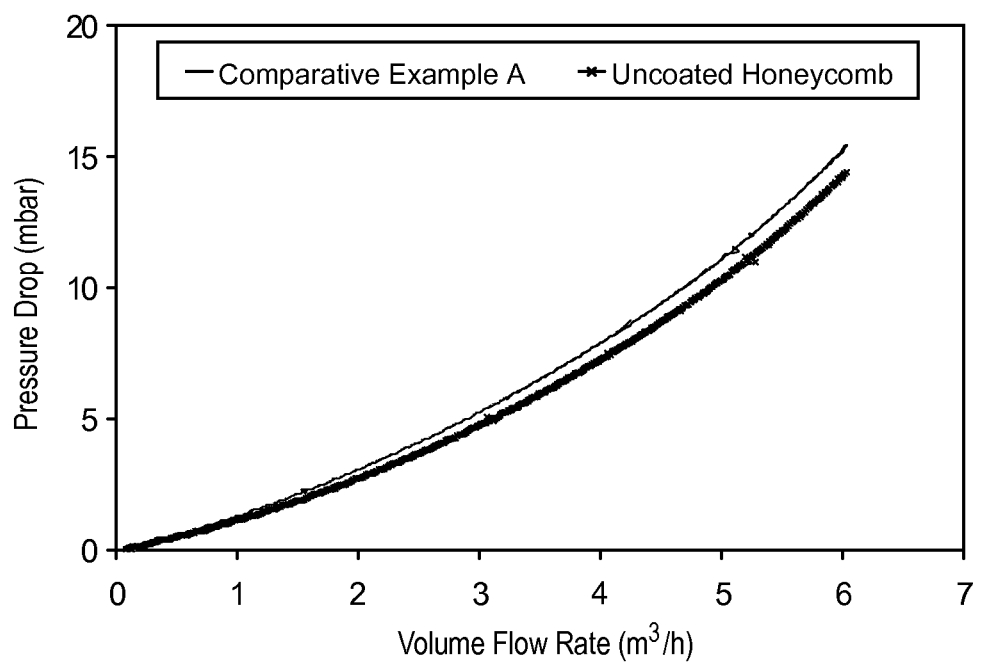
FIG. 1 is a graph depicting the pressure drop of a sample of honeycomb structure without a polymer coating according to one aspect of the disclosure.

To study the effect of cement coating on the pressure drop of honeycomb, a 10 cell×10 cell×3 inches acicular mullite (ACM) honeycomb with 200 cells per square inch (CPSI) of cell structure was used. Its pressure drop was measured by a 3051 Pressure Transmitter (available from Rosemount Inc, Eden Prairie, Minn.). The cement mixture was then coated onto the periphery of the honeycomb and fired to 1100° C. to obtain the final parts. After firing, the pressure drop of the coated 10 cell×10 cell×3 inches honeycomb was measured again. The pressure drop data is illustrated in FIG. 1. The honeycomb exhibits higher pressure drop after being coated with cement in this example on the periphery. At 6 m$^3$/h air flow rate, the pressure drop of honeycomb with cement coating is 6% higher than without cement coating. Scanning electron micrograph analysis of honeycomb substrate after cement coating shows alumina inorganic binder migrates to the substrate and forms coating on and among ACM needles, as shown in FIG. 2. The increased pressure drop of honeycomb after cement coating and the SEM image suggest that the binder migration into honeycomb substrate has resulted in higher pressure drop in honeycomb substrate. The pressure drop in Comparative Example A is used to compare with that of Example 1.

The mixture was also used as cement and skin for a segmented honeycomb with four segment assembly. The cylindrical segmented honeycomb has a length of 6 inches (15.2 cm) and a diameter of 5.66 inches (14.4 cm) and the segments have a cell structure of 200 CPSI. The segmented honeycomb was subjected to a burner test, in which hot air was passed through filters to create thermomechanical stress on the part. In the test, the filter was heated up at 250° C./min to 750° C. and at 350° C./min in separate test. The temperatures at a number of locations were recorded and the locations in the burner test are illustrated in FIG. 3. The temperature gradients in the part were calculated by subtracting the temperature of an individual location in a segment from the temperature at location 15, which is in the center of the segment. The temperature gradients of the filter of the two burner tests were shown in FIGS. 4 and 5. The temperature gradients in Comparative Example A are used to compare with Example 1.

Figure 6:
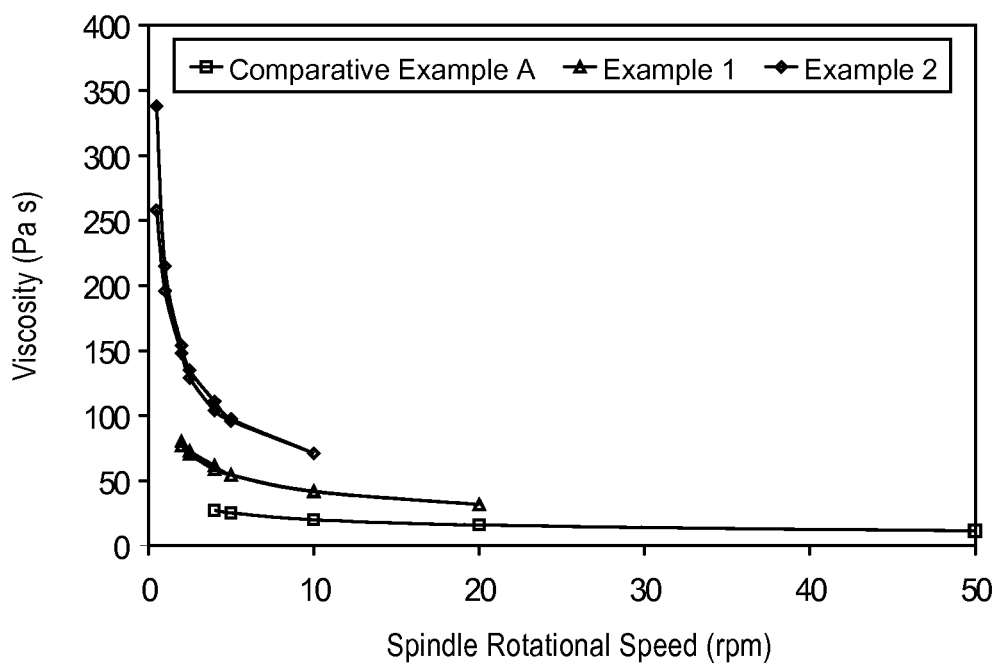
FIG. 6 is a graph representative of the viscosity of cements used in at least one aspect of the disclosure.

Viscosity of cement was measured by a viscometer (Model: RVDV-I Prime) from Brookfield Engineering Laboratories, Inc. (Middleboro, Mass.) with a No. 6 disc spindle at room temperature. The viscosity of the cement in this example is illustrated in FIG. 6 and is used to compare with that of Example 1.

To study the effect of binder migration on the elastic modulus of honeycomb substrate, a honeycomb was skinned with the cement in this example and fired to 1400° C. for 6 h. Elastic modulus was measured by Grindosonic method following ASTM Standard C1259-98, Standard Test Method for Dynamic Young's Modulus, Shear Modulus, and Poisson's Ratio for Advanced Ceramics by Impulse Excitation of Vibration. The elastic modulus of honeycomb substrate right underneath the skin of this example was 27 GPa. This is about 13% increase in modulus compared with the elastic modulus of a honeycomb substrate before coating with cement and skin, which was 24 GPa. The binder migration and sintering have resulted in the increase in elastic modulus of honeycomb substrate.

Example 1

In this example, the amounts of all components in Comparative Example A are the same except that the amount of water is reduced to 90% of the amount of water added in Comparative Example A. Therefore, in this formulation, 43.9 wt % of ball milled aluminum zirconium silicate fiber (FIBERFRAX Long Staple Fine fiber, available from Unifrax LLC, Niagara Falls, N.Y.), 14.1 wt % of colloidal alumina (AL20SD, available from Nyacol Nano Technologies, Inc, Ashland, Mass.), 38 wt % of water, 2 wt % methyl cellulose (METHOCEL A15LV, available from The Dow Chemical Co. Midland, Mich.), and 2 wt % polyethylene glycol 400 (available from Alfa Aesar, Ward Hill, Mass.) were mixed to achieve uniform mixture. A 10 cell×10 cell×3 inches acicular mullite (ACM) honeycomb and cylindrical segmented honeycomb has a length of 6 inches (15.2 cm) and a diameter of 5.66 inches (14.4 cm) with 200 CPSI cell structure were also fabricated as in Comparative Example A to study pressure drop and temperature gradients.

The viscosity of cement in Example 1 is shown in FIG. 6. Compared with Comparative Example A, the reduction of water in the cement formulation has resulted in the increase of viscosity. Besides the amount of water available for diffusion is reduced, the increased viscosity of the cement slows the diffusion of cement through porous honeycomb in the drying process.

Figure 7:
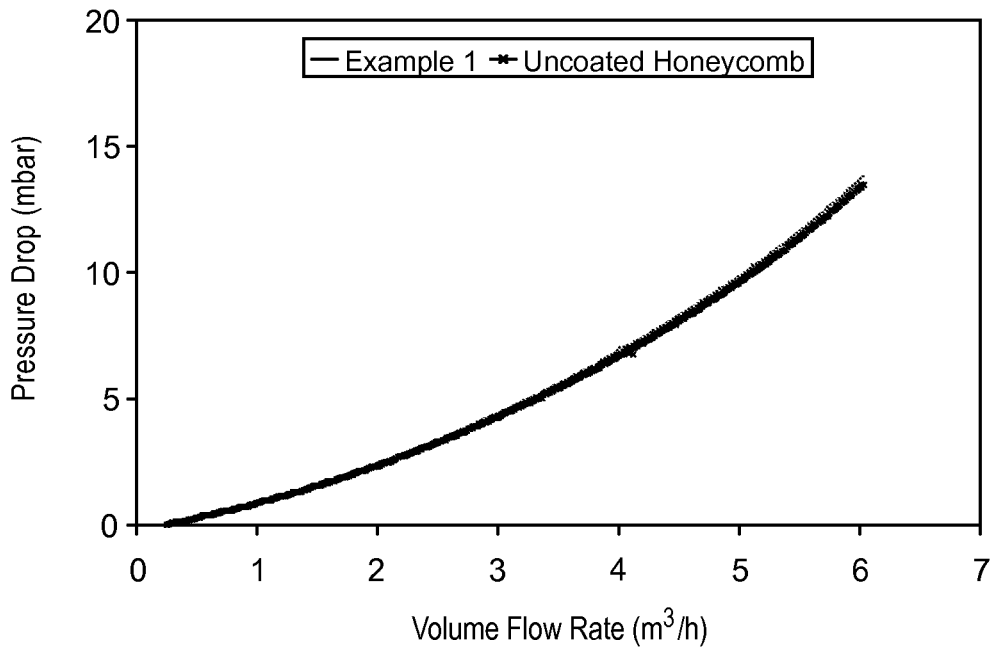
FIG. 7 is a graph representative of the pressure drop of a sample of honey comb structure with and without a polymeric coating according to one aspect of the disclosure.

The pressure drop of the 10 cell×10 cell×3 inches honeycomb shown in FIG. 7 demonstrates that the increase in pressure drop in the honeycomb coated with Example 1 cement is less than the increase in Comparative Example A, as shown in FIG. 1. The pressure drop increase of honeycomb coated with Example 1 at 6 m$^3$/h air flow rate is 3%, which is only half of the 6% increase for honeycomb coated with Comparative Example A. The reduced amount of water has resulted in reduced alumina binder migration and pressure drop increase.

Figure 4:
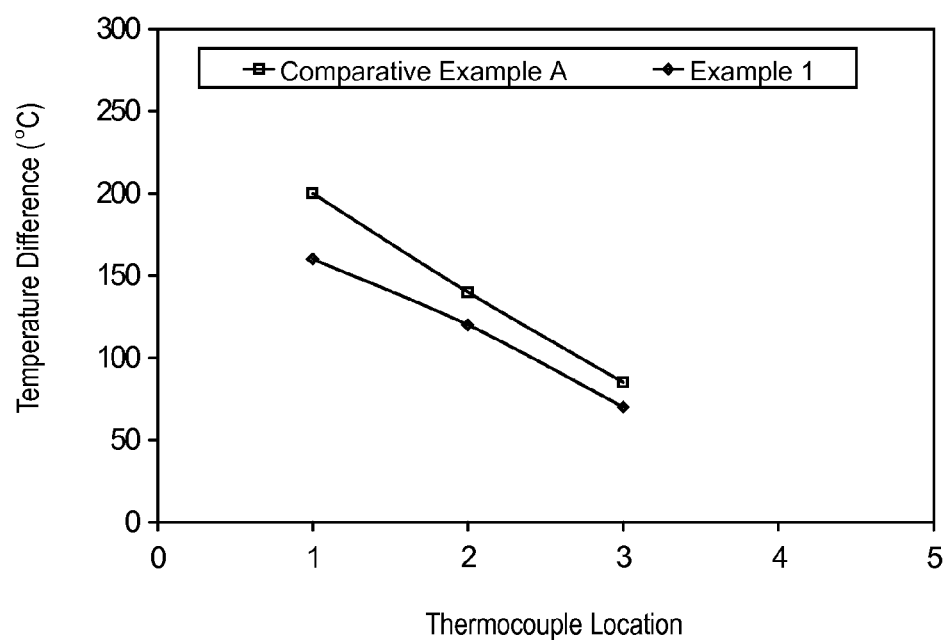
FIG. 4 is a graph representing temperature differences between locations in a burner test of segmented filters with a heating rate of 250° C./min.
Figure 5:
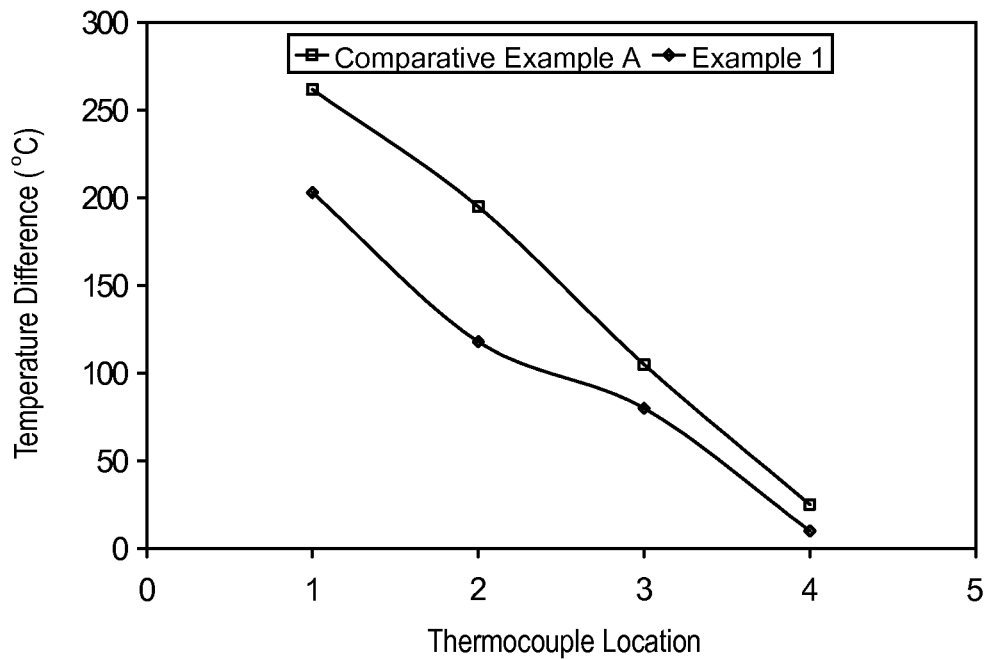
FIG. 5 is a graph representing temperature differences between locations in a burner test of segmented filters with a heating rate of 350° C./min.

The temperature gradients of the segmented filter with Example 1 cement in 250 and 350° C./min burner tests are shown in FIGS. 4 and 5. Segmented filter with Example 1 cement and skin demonstrated lower temperature gradients than the filter with Comparative Example A cement and skin. For the temperature gradients between locations 1 and 15, the reduction was about 20-25%. Therefore, the reduced water content in cement formulation has resulted in lower temperature gradients in the parts and hence improved the thermal shock robustness of honeycomb filters.

Example 2

In this example, the amounts of all components in Comparative Example A are the same except that the amount of water is reduced to 85% of the amount of water added in Comparative Example A. Therefore, in this formulation, 44.8 wt % of ball milled aluminum zirconium silicate fiber (FIBERFRAX Long Staple Fine fiber, available from Unifrax LLC, Niagara Falls, N.Y.), 14.4 wt % of colloidal alumina (AL20SD, available from Nyacol Nano Technologies, Inc, Ashland, Mass.), 36.6 wt % of water, 2.1 wt % methyl cellulose (METHOCEL A15LV, available from The Dow Chemical Co. Midland, Mich.), and 2.1 wt % polyethylene glycol 400 (available from Alfa Aesar, Ward Hill, Mass.) were mixed to achieve uniform mixture.

The viscosity of cement in Example 2 is shown in FIG. 6. Compared with Comparative Example A and Example 1, the 15% reduction of water in the cement formulation has resulted in the lowest amount of water and hence the highest viscosity for the cement in this example. The further increase in the viscosity of the cement further slows the diffusion of cement through porous honeycomb in the drying process.

Figure 8:
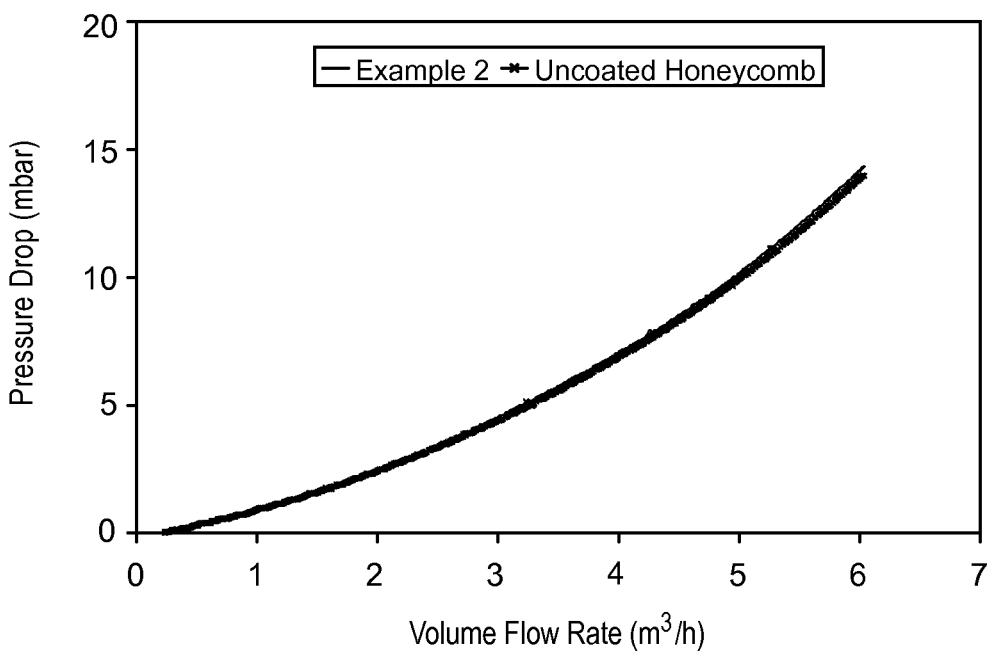
FIG. 8 is a graph representative of the pressure drop of a sample of honey comb structure with and without a polymeric coating according to another aspect of the disclosure.

A 10 cell×10 cell×3 inches ACM honeycomb with 200 CPSI cell structure was also fabricated as in Comparative Example A to study pressure drop. The pressure drop of the honeycomb shown in FIG. 8 demonstrates that the increase in pressure drop in the honeycomb coated with Example 2 cement is less than the increase in Comparative Example A. The pressure drop increase of honeycomb coated with Example 2 at 6 m$^3$/h air flow rate is 2%, which is less than the 6% increase for honeycomb coated with Comparative Example A and the 3% increase for honeycomb coated with Example 1. The further reduction of the amount of water in cement formulation has resulted in further reduction in alumina binder migration and pressure drop increase.

Example 3

36 wt % of ball milled aluminum zirconium silicate fiber (FIBERFRAX Long Staple Fine fiber, available from Unifrax LLC, Niagara Falls, N.Y.), 48 wt % of colloidal alumina (Cerama-Bind 644A, available from Aremco Products Inc., Valley Cottage, N.Y.), 16 wt % of colloidal silica (Cerama-Bind 644S, available from Aremco Products Inc., Valley Cottage, N.Y.) were mixed to achieve a uniform mixture. The 644A colloidal alumina has a pH of 4 while the 644S colloidal silica has a pH of 9, the mixing of the alumina and silica binders resulted in gelling of the binders and fibers were suspended in the binder gel.

Figure 9:
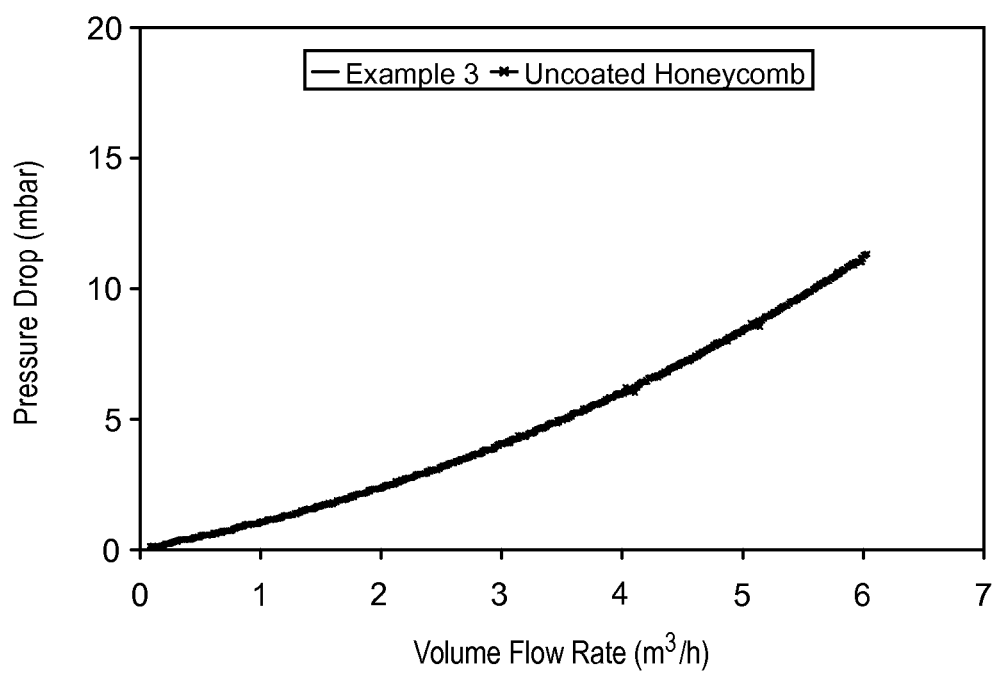
FIG. 9 is a graph representative of the pressure drop of a sample of honey comb structure with and without a polymeric coating according to one aspect of the disclosure.

A 10 cell×10 cell×3 inches ACM honeycomb with 200 CPSI cell structure was also fabricated as in Comparative Example A to study pressure drop. The pressure drop of the honeycomb shown in FIG. 9 demonstrates that there was no pressure drop increase after the honeycomb was coated with Example 3. The gelling of inorganic binders by mixing alumina and silica binders has resulted in the immobilization of binders and hence no binder migration into the honeycomb substrate.

What is claimed:

1. A method for forming a ceramic honeycomb structure comprising:
   (i) coating said ceramic honeycomb structure with a polymer to create a polymeric barrier coating; wherein the polymer penetrates into or covers a plurality of pores in the ceramic honeycomb structure to form a thin barrier layer thereon;
   (ii) curing said polymeric barrier coating;
   (iii) applying a cement about a periphery of the ceramic honeycomb structure, including a plurality of peripheral cells having exposed interiors;
   wherein the cement is comprised of inorganic fibers and a binding phase which is comprised of amorphous silicate, aluminite or alumino silicate glass and other inorganic particles; and
   wherein the thin barrier layer mitigates migration of said inorganic fibers and the binding phase into said plurality of pores;
   (iv) burning off said polymeric barrier coating at or below a firing temperature of the cement, or at or below honeycomb operating temperatures during application if cold set cement is used
   (v) bonding the cement to the ceramic honeycomb structure to form a porous inorganic skin about the periphery of the ceramic honeycomb structure.

2. The method of claim 1, further including adding additives to accelerate curing of said polymeric barrier coating.

3. The method of claim 2, wherein said additives are selected from the group consisting of polyamine monomers, cobalt compounds, and mixtures thereof.

4. The method of claim 1, wherein said polymer is an organic polymer; and the organic polymer is hydrophobic, hydrophilic, or a mixture thereof.

5. The method of claim 4, wherein the polymeric barrier coating is a hydrophobic polymeric barrier coating which mitigates the migration of water into the plurality of pores.

6. The method of claim 5, wherein the organic polymer is a hydrophobic polymer which creates a barrier between the binding phase and the plurality of pores to prevent migration of the inorganic fibers and the binding phase; and
   the hydrophobic polymer vaporizes during firing.

7. The method of claim 4, wherein the organic polymer is a hydrophilic polymer which coats the plurality of pores to reduce a relative size of the plurality of pores to prevent migration of the inorganic fibers and the binding phase; and
   the hydrophilic polymer vaporizes during firing.

8. The method of claim 1, wherein said polymeric barrier coating mitigates migration of inorganic binder into the plurality of pores.

9. The method of claim 1, wherein said polymeric barrier coating is applied by brushing, spraying, rolling, dip coating, powder coating and melting.

10. The method of claim 1, further including increasing air flow over said ceramic honeycomb structure to enhance curing of said polymeric barrier coating.

11. The method of claim 1, further including increasing temperature over said ceramic honeycomb structure to enhance curing of said polymeric barrier coating.

12. The method of claim 1, wherein said polymer includes at least one inorganic polymer and wherein said inorganic polymer contains a non-carbon element in repeating units.

13. The method of claim 12, wherein the at least one inorganic polymer fills the plurality of pores or forms a film over the plurality of pores.

14. The method of claim 1, wherein the polymer is insoluble in any honeycomb skin or cement solvent after said polymer has formed said barrier coating.

15. The method of claim 1, wherein the polymeric barrier coating is burned off below the firing temperature of the cement; and
   wherein the method includes firing the ceramic honeycomb structure to the firing temperature, after the polymer is burned off, to bond the cement to the ceramic honeycomb structure and form the porous inorganic skin about the periphery of the ceramic honeycomb structure.

16. The method of claim 15, wherein the firing temperature is at least 800° C.

17. The method of claim 16, wherein the firing temperature is at least 1000° C.

18. The method of claim 1, wherein after forming the porous inorganic skin, functional materials with catalytic properties or which function as sorbents are applied to the ceramic honeycomb structure.

19. The method of claim 1, wherein the inorganic fibers are part of an inorganic filler of the cement and the inorganic filler includes at least 40 percent by weight of the inorganic fibers; and
   the cement contains no more than 5 percent by weight of the inorganic particles.

* * * * *